E. A. SPERRY.
METHOD AND APPARATUS FOR SEPARATING FOREIGN SUBSTANCES FROM LEAD MATTES.
APPLICATION FILED FEB. 7, 1919.
1,401,743.
Patented Dec. 27, 1921.
3 SHEETS—SHEET 2.
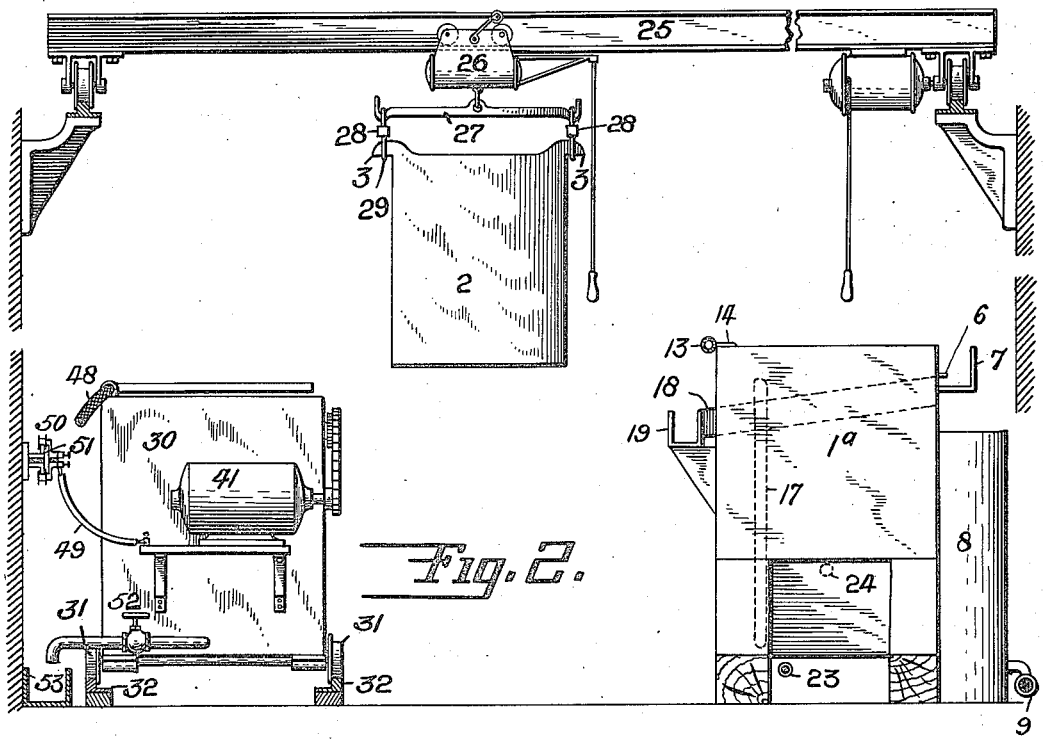
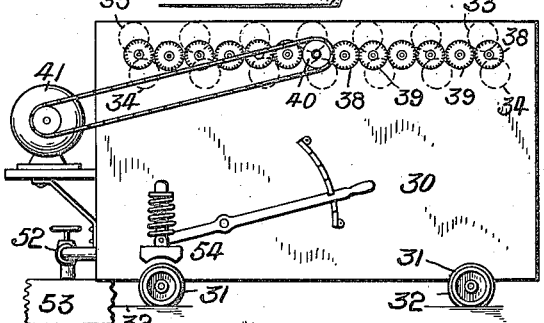
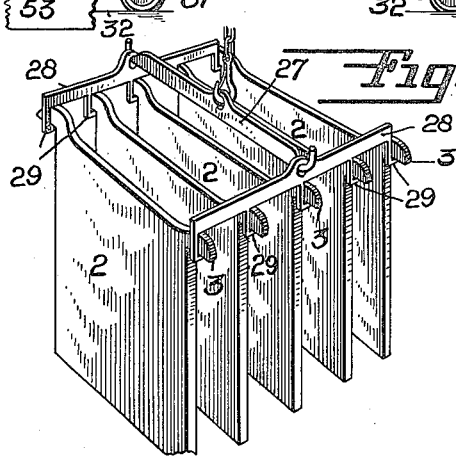
INVENTOR
*Elmer A. Sperry*
BY
*Herbert H. Thompson*
his ATTORNEY E. A. SPERRY.
METHOD AND APPARATUS FOR SEPARATING FOREIGN SUBSTANCES FROM LEAD MATTES.
APPLICATION FILED FEB. 7, 1919.
1,401,743.
Patented Dec. 27, 1921.
3 SHEETS—SHEET 3.
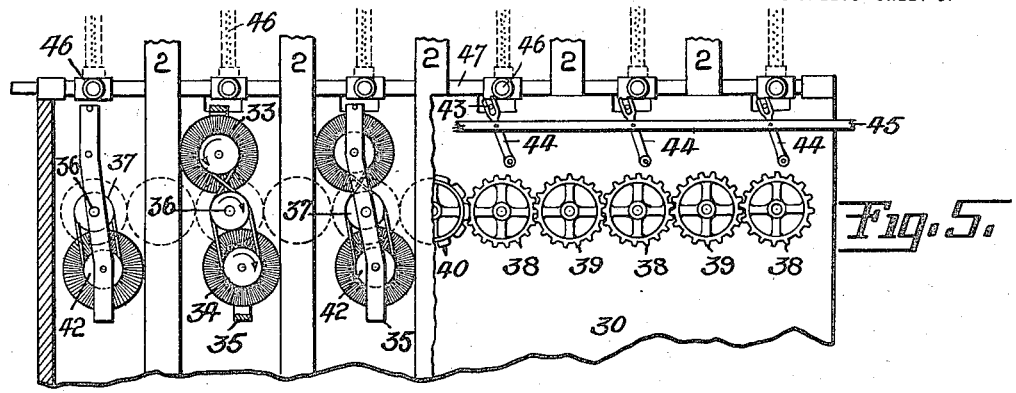
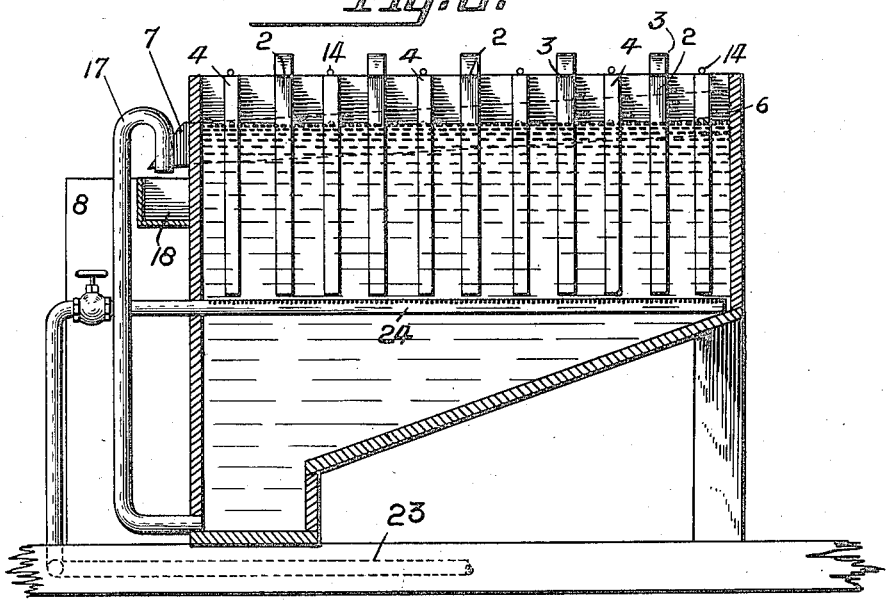
INVENTOR
Elmer A. Sperry.
BY Herbert H. Thompson
his ATTORNEY

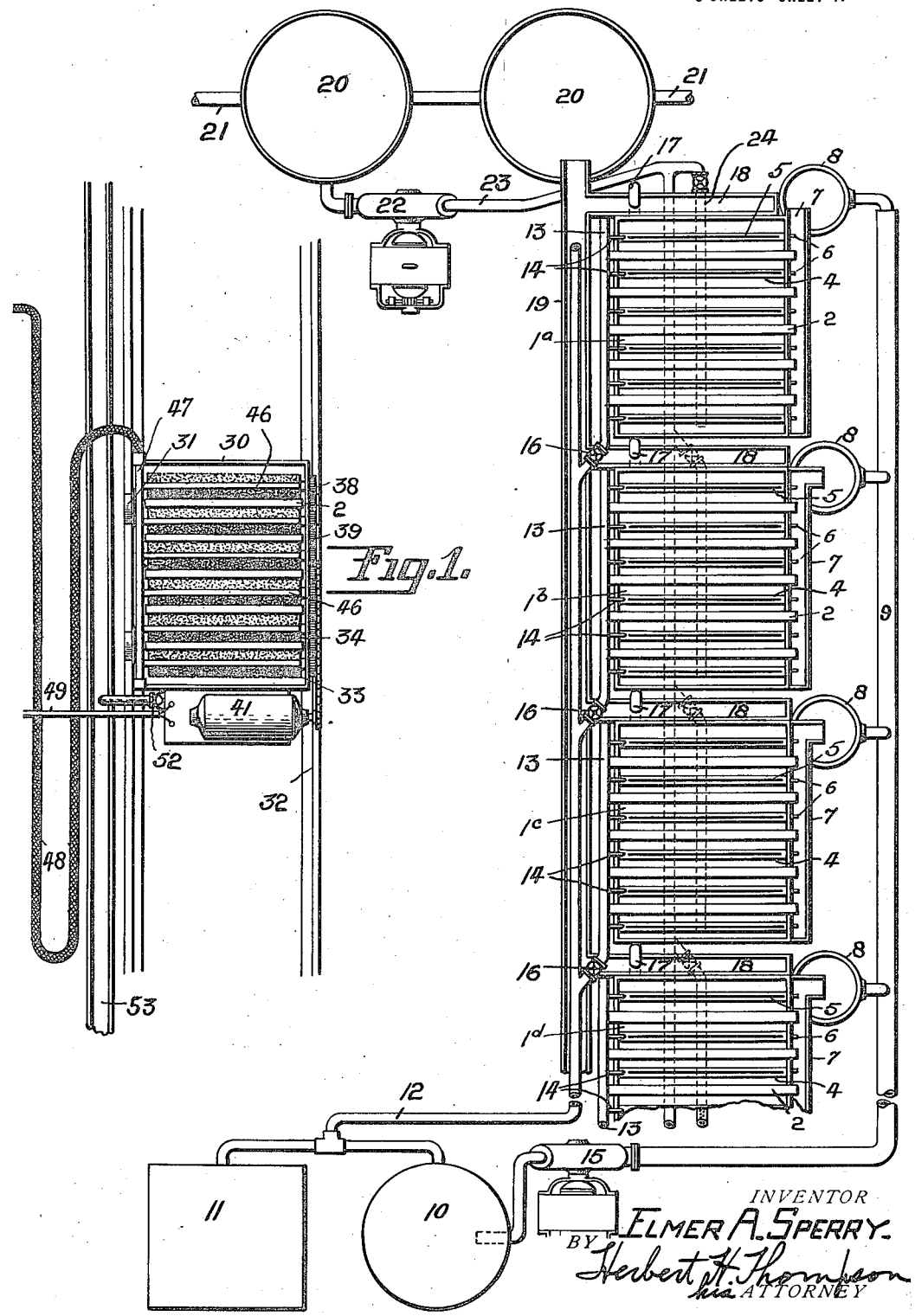

UNITED STATES PATENT OFFICE.

ELMER A. SPERRY, OF BROOKLYN, NEW YORK.

METHOD AND APPARATUS FOR SEPARATING FOREIGN SUBSTANCES FROM LEAD MATTES.

1,401,743.   Specification of Letters Patent.   Patented Dec. 27, 1921.

Application filed February 7, 1919. Serial No. 275,634.

*To all whom it may concern:*

Be it known that I, ELMER A. SPERRY, a citizen of the United States of America, residing at 1505 Albermarle road, Brooklyn, New York, in the county of Kings and State of New York, have invented certain new and useful Improvements in Methods and Apparatus for Separating Foreign Substances from Lead Mattes, of which the following is a specification.

This invention relates to a method and apparatus contained in lead mattes or agglomerate masses of lead and other metals in which the lead is present in excess, usually in its chemically uncombined or metallic state.

In the processes of metallurgy large quantities of lead mattes are formed containing many foreign substances and metals either alloyed or mechanically commingled with the metallic lead, which is usually present in excess.

One of the principal objects of the present invention is to provide a method and means for separating the constituents of these mattes into two groups, one based on pure lead preferably in the form of one of its components and the other containing more or less of the foreign bodies or metals.

Another object is to recover the lead in the form of a commercially useful and valuable compound. Further objects and advantages will appear as the invention is hereinafter developed.

Referring to the drawings which illustrate one form of apparatus preferred at this time for carrying the method into effect:

Figure 1 is a plan view, with certain parts broken away, of a complete form of apparatus for carrying the method into effect.

Fig. 2 is an elevation thereof.

Fig. 3 is a detail side elevation of one form of scrubbing machine.

Fig. 4 is a detail perspective of a portion of the means for transferring the anode plates.

Fig. 5 is a fragmentary detail elevation partly in section of the machine shown in Fig. 3.

Fig. 6 is a detail side elevation of one of the cells with parts broken away.

The method at present preferred may be outlined generally as follows. The mattes are employed as the anodes of a suitable electrolytic cell to dissolve the lead therefrom and to leave the foreign metals and other impurities on the surface of these anodes in the form of an adherent coating or slime. This coating, which usually contains gold, silver, antimony, zinc, bismuth, platinum, palladium, copper, arsenic, and other metals, may be removed from the anodes exteriorly of the cell and the foreign metal, last enumerated, recovered.

It is highly desirable and advantageous that the lead be recovered from the cell in the form of a commercially valuable compound such as white lead for example. In order to effect this result the dissolved lead in the cell should be attacked by a precipitating agent away from the surface of the anodes so that the precipitated lead compound will not mingle with or adhere to the coating on said anodes. It is also important that the lead in solution as well as the precipitated lead compound be kept away from the cathode or cathodes. For these reasons, among others I prefer to employ an electrolytic cell and process such as that invented by Ralph M. Harrington and for which United States Letters Patent, No. 1,308,948, "Method of producing lead salts" was granted July 8, 1919.

My method may perhaps be best described, in its more specific aspects, in conjunction with the description of the specific form of apparatus illustrated. The lead mattes are cast in suitable shape to be employed as anodes 2 in one or more electrolytic cells $1^a$, $1^b$, $1^c$, $1^d$, etc. These anodes 2 are shown provided with laterally extending ears 3 which are adapted to rest on the cell casings to support them in the cells and preferably of such dimensions as to extend beyond the sides of the cell for a purpose which will hereinafter appear. Each of these cells, $1^a$, $1^b$, etc., is preferably of the bi-fluid type, cathode compartments 4 containing the cathodes 5 of copper, iron, or other suitable metal, being interposed between the anodes 2. The sides of these compartments are composed of diaphragms having more or less osmotic properties as for example parchment paper or parchmentized canvas or duck. The electrical connections of the cells have not been shown, it being understood that the cathodes 5 and anodes 2 are to be connected to the terminals of a suitable source of direct current.

Both the anolyte and the catholyte are preferably of the alkaline type. Thus the anolyte may be about a three per cent. solution of sodium acetate or other alkaline metal salt capable of yielding a lead solvent. If desirable a small amount of sodium carbonate or lead acetate may be added. The catholyte consists of the same solution as the anolyte, sodium acetate in the present instance, except that its alkalinity is much higher than that of the anolyte, say about fifty times as strong. A small amount of soluble carbonate or hydrate or mixture of these may be added to the catholyte. Thus sodium carbonate or bicarbonate may be employed.

Assuming that the lead mattes 2 are placed in the cells and a current passed through the latter the following reactions will take place in each cell.

At the anodes, the sodium acetate reacts with the lead to dissolve the latter in the form of lead acetate. Thus:—

$$2Na(C_2H_3O_2)+Pb=Pb(C_2H_3O_2)_2+2Na$$

The lead being removed from the surface of the anodes, the foreign metals and other impurities are left on the anode surfaces in the form of an adherent coating or slime. At the cathode, sodium reacts with water to form sodium hydroxid. Thus:—

$$Na+H_2O=NaOH+H$$

While the lead in solution in the anolyte may be recovered in various ways I prefer to recover it in the form of a commercially valuable lead compound by precipitating the latter in the anolyte within the cell. This may be done by introducing a suitable reagent into the catholyte. Thus for example an acid radical such as chromic acid or sulfuric acid or carbonic acid may be added to the catholyte depending on the particular lead compound sought. At present it is preferred to recover the lead in the form of white lead so that carbon dioxid is added to the catholyte. A convenient way of adding this acid radical is as follows.

The cathode compartments 4 are each provided with an overflow pipe 6 which pipes empty into troughs 7 in turn emptying into reservoirs 8. The latter are connected to a pipe 9 in which a motor-driven pump 15 is connected to raise the catholyte to the carbonating tower 10. The catholyte passes through the latter either into the reservoir 11 or through pipe 12 to the various cells. The pipe 12 is provided with a series of branch pipes 13, one for each cell, which branch pipes are provided in turn with a plurality of branch pipes 14, one for each of the cathode compartments 4. The last mentioned pipes extend into and terminate adjacent the bottom of the corresponding cathode compartments 4. Properly scrubbed carbon dioxid is passed through the carbonating tower 10 so that the catholyte comes into contact with it when circulated by the pump 15.

The carbon dioxid reacts with the sodium hydroxid in the catholyte to form sodium carbonate. Thus:—

$$3NaOH+CO_2=Na_2CO_3+NaOH+H_2O$$

The sodium carbonate thus formed diffuses through the diaphragms and attacks the lead acetate in the anolyte to precipitate white lead in the anolyte within the cell. Thus:—

$$3Pb(C_2H_3O_2)_2+2Na_2CO_3+NaOH=\\2PbCO_3PbO_2H_2+6Na(C_2H_3O_2)$$

An extremely important feature should be noted, i. e. the white lead is precipitated away from the anodes so that there is no danger of its mingling or adhering to the coating of foreign metals and other substances on said anodes or otherwise interfering with the proper operation of the cells. This action is brought about by properly controlling the rate of diffusion of the carbonate through the diaphragms. As this rate is substantially equal to the rate at which the carbonate is introduced within the cathode compartments the above mentioned control may readily be effected by operating the valves 16 one of which is provided in each of the branch pipes 13.

The precipitated lead compound, in the present instance white lead, may be removed from the cells $1^a$, $1^b$, etc., by circulating the anolyte and removing the precipitate exteriorly of the cells. One form of circulating loop is shown in the drawings as comprising the following elements. A pipe 17 leads from the bottom of each cell and is provided with an outlet, at the liquid level of said cells, into a corresponding one of troughs 18. The latter empty into a trough 19 which in turn empties into one or more settling tanks 20. The white lead settles in the latter and may be withdrawn at the bottom outlets 21. The anolyte is drawn from adjacent the top of one of the tanks 20 by means of a pump 22 which pumps the anolyte through a pipe 23 and branch pipes 24 into the various cells.

In order to remove the aforementioned anode coating the anodes 2 are from time to time removed from the cells, the coating removed and the anodes reinserted into the cells. This cycle is repeated until the mattes are substantially completely consumed. While various forms of apparatus may be employed to effect the removal and reinsertion of the anodes and the removal of said anode coating I prefer to employ the means illustrated in the drawings and constructed substantially as follows:

A traveling crane 25 comprising a hoist 26 is provided for the purpose of removing the anodes 2 from the cells. It is important from the standpoint of efficiency that all of the anodes of at least one cell be removed simultaneously. The hoist 26 is accordingly provided with a bar 27 which supports a pair of cross-bars 28. The latter are each provided with a series of hooks 29 so spaced as to seat under the ears 3 when the anodes 2 are in the cells.

A scrubbing machine 30 is provided for the purpose of removing the coating of the anodes 2. While this machine may be stationary it is preferable to mount it on wheels 31 which travel on rails 32 so that it may be brought opposite the particular electrolytic cell from which the plates 2 are to be removed and the total time the plates are out of the cell minimized. The said machine 30 is provided with a plurality of sets of rotary scrubbers. Each set is shown as comprising a pair of brushes or scrubbers. 33, 34 rotatably mounted in a substantially rectangular frame 35 loosely pivoted on a shaft 36 journaled in opposite sides of the machine 30. The shafts 36 have secured thereto pulleys or sprockets 37 and are interconnected by gears 38 secured to each of said shafts and meshing with idlers 39. One of said shafts is provided with a sprocket wheel 40 which is chain connected to an electric motor or other power means 41 carried by the car. Each of the shafts of the brushes 33, 34 has secured thereto a pulley or sprocket 42 chain-connected to those on shafts 36 to be driven in opposite directions. The motor 41 is rotated in such a direction as to cause the active portions of the brushes to rotate downwardly as indicated by the arrows in Fig. 5. It will be noted that the sets of brushes may be moved toward and away from the anode plates, which they are adapted to engage, by virtue of the fact that the frames 35 are swiveled on shafts 36. This feature is doubly important in that it not only facilitates entry of the anodes but permits proper engagement between the brushes and plates in spite of the varying thickness of the latter due to consumption in the electrolytic cells. In order to facilitate movement of the frames 35 the latter may each be provided with a laterally projecting pin 43, each of which pins seats in the forked end of a corresponding one of levers 44 pivoted on the exterior of the car 30. By moving a link 45 pivotally connected to all of said levers 44 the brushes may be moved to active or inactive position.

It will be apparent that by lowering a series of anodes between the scrubbers 33, 34 and moving the latter to active position the plates will be scrubbed and the coating containing the foreign metal and substances removed. The anodes will not only be scrubbed when being lowered but also when being raised from the machine 30. In order to remove the last trace of coating and foreign matter from the anodes a plurality of spray pipes 46 are provided above the scrubbers. The main pipe 47 to which the said pipes 46 are connected is preferably swiveled on the car 30 so as to be movable from the full line position to the dotted line position shown in Fig. 5. Ready access to the scrubbers is thereby afforded. Water may be supplied to the pipe 47 by means of a flexible tube or hose 48 connected thereto and to a suitable source of supply.

Power may be supplied to the motor 41 by means of flexible conductors 49 connected thereto and to a trolley 50 which travels on conductors 51. The car 30 may also be provided with a valve controlled outlet 52 adapted to empty into a long trough 53 so that the car may be conveniently drained of its contents from time to time. A manually operable brake 54 may also be provided on said car for the purpose of holding the latter stationary while the anodes 2 are being scrubbed.

The complete operation may be summarized as follows. The mattes cast in suitable shape are placed in the cells $1^a$, $1^b$, etc., after the latter have been suitably charged. The electrolyte is then circulated and the cells electrically energized. The white lead is drawn from the settling tanks 20 and the coating is removed from the anodes intermittently. This may be done by simultaneously lifting all of the anodes of one cell and submerging them one or more times in the scrubbing car 30 by means of the traveling crane and hoist. The cleaned group of anodes may then be dropped into place in the cell from which they were removed and the plates from the next cell treated in the same way. The slime or coating in the car 30 may be dried and smelted or treated in other ways and the foreign metals or other substances recovered. The above process is repeated until the anodes are substantially completely consumed when new anodes are employed and the process again repeated.

Care should be taken in the selection of the composition of the electrolytes. The latter should be of such a type as not to act on the foreign metals in the anode mattes. Furthermore, the carbon dioxid contents of the catholytes should be so regulated that the lead compound is precipitated away from the surface of the anodes.

Bismuth, which is usually found in the mattes, is found to possess the property of giving the desirable slimy adherent characteristic on the surface of the anodes as the latter are being dissolved. If it is found that the coating formed does not cling properly to the anodes, i. e. that the sliming agent is not sufficiently abundant in the matte, a quantity of bismuth or other sliming agent may be added to the melt when the anodes are prepared.

It is evident that a certain relation between the total amount of foreign materials and the lead in the matte should exist for the most efficient operation. If the removal of the slime or coating from the anode surfaces must be made too frequently, the matte should be enriched in lead, while if the coating forms too slowly there should be less lead, so that the process can go forward at the highest production efficiency consistent with the repeated brief interruptions in the electrolyzing step in the process.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. The method of separating lead from a matte containing lead in excess and other metals which comprises dissolving lead from said matte by passing an electric current from the matte through an electrolyte in an electrolytic cell, preventing the dissolved lead from reaching the cathode and removing the separated lead and other metals from the cell.

2. The method of separating lead from a matte containing lead in excess and other metals which comprises dissolving lead from said matte by passing an electric current from the matte through an electrolyte in an electrolytic cell, preventing the dissolved lead from reaching the cathode, precipitating the dissolved lead as a lead salt, and removing the precipitated lead and other metals from the cell.

3. The method of separating lead from a matte containing lead in excess and other metals which comprises dissolving lead from said matte by passing an electric current from the matte through an electrolyte in an electrolytic cell, preventing the dissolved lead from reaching the cathode, precipitating the dissolved lead as a carbonate of lead, and removing the precipitated lead and other metals from the cell.

4. The method of separating lead from a matte containing lead in excess and other metals which comprises dissolving lead from said matte by passing an electric current from the matte through an electrolyte in a bi-fluid electrolytic cell, preventing the dissolved lead from reaching the cathode and removing the separated lead and other metals from the cell.

5. The method of separating lead from a matte containing lead in excess and other metals which comprises dissolving lead from said matte by passing an electric current from the matte through an electrolyte in an electrolytic cell containing a diaphragm separating the anolyte and catholyte therein, and removing the separated lead and other metals from the cell.

6. The method of separating lead from a matte containing lead in excess and other metals which comprises dissolving lead from said matte by passing electric current from the matte through an electrolyte in a bi-fluid cell, precipitating the dissolved lead as a salt by a reagent introduced into the catholyte and separately removing the precipitated lead and other metals from the cell.

7. The method of separating lead from a matte containing lead in excess and other metals which comprises dissolving lead from said matte by passing electric current from the matte through an electrolyte in a bi-fluid cell, precipitating the dissolved lead as a salt by a reagent introduced into the catholyte at a point outside of the cell and separately removing the precipitated lead and other metals from the cell.

8. The method of separating lead from a matte containing lead in excess and other metals which comprises dissolving lead from said matte by passing electric current from the matte through an alkaline electrolyte in a bi-fluid cell, precipitating the dissolved lead as a salt by an acid radical introduced into the catholyte and separately removing the precipitated lead and other metals from the cell.

9. The method of separating lead from other metals embodied in a matte which comprises dissolving the lead from said matte by electrolysis, leaving the other metals on the surface of the matte in the form of an adherent coating, and separately removing the lead and said coating from the electrolytic cell.

10. The method of separating lead from other metals embodied in a matte which comprises dissolving the lead from said matte by employing the matte as the anode in an electrolytic cell, leaving the other metals on the surface of the matte in the form of an adherent coating, preventing the lead from reaching the cathode of the cell and separately removing the lead and said coating from the cell.

11. The method of separating lead from other metals embodied in a matte which comprises dissolving the lead from said matte by electrolysis, leaving the other metals on the surface of the matte in the form of an adherent coating, precipitating the lead as a lead salt, and separately removing the lead salt and said coating from the electrolytic cell.

12. The method of separating lead from other metals embodied in a matte which comprises dissolving the lead from said matte by electrolysis, leaving the other metals on the surface of the matte in the form of an adherent coating, precipitating the lead as a carbonate of lead, and separately removing the lead carbonate and said coating from the electrolytic cell.

13. The method of separating lead from the other metals embodied in a matte which comprises dissolving the lead from said matte and forming a coating containing said other metals on the surface of the matte by electrolysis, continuously removing the lead and intermittently removing the coating from the cell.

14. The method of separating lead from the other metals embodied in a matte which comprises dissolving the lead from said matte and forming a coating containing said other metals on the surface of the matte by passing a current from said matte to a cathode in an electrolytic cell, removing the lead from the electrolyte and removing the coating from the matte exteriorly of the cell.

15. The method of separating lead from the other metals embodied in a matte which comprises alternately dissolving lead from the matte by electrolysis and removing the coating, containing the said other metals, from the matte exteriorly of the electrolytic cell.

16. The method of separating lead from the other metals embodied in mattes which comprises dissolving lead from said mattes electrolytically by employing them as anodes in an electrolytic cell, then removing the coating, formed on all of said mattes, simultaneously and exteriorly of the cell and repeating the above cycle.

17. The method of separating lead from the other metals embodied in mattes which comprises dissolving lead from said mattes electrolytically by employing them as anodes in an electrolytic cell, removing the said anodes, scrubbing said anodes simultaneously, reinserting the anodes into the cell and repeating the above cycle until the mattes are substantially consumed.

18. The method of separating lead from the other metals embodied in a matte which comprises dissolving lead from said matte electrolytically by employing the matte as the anode of an electrolytic cell, and thereby leaving the other metals on the surface of the anode, precipitating the dissolved lead at a position removed from the surface of the anode and removing the said other metals from the surface of the anode.

19. The method of separating lead from the other metals embodied in a matte which comprises dissolving lead from said matte electrolytically by employing the matte as the anode of an electrolytic cell, and thereby leaving the other metals on the surface of the anode, attacking the dissolved lead by a precipitating agent liberated by the cathode action at such a rate as to cause precipitation away from the anode surface and removing the said other metals from the surface of the anode.

20. The method of separating lead from other metallic impurities embodied in matte which comprises dissolving lead and leaving the impurities on the surface of the matte by employing the latter as the anode in a bifluid electrolytic cell, attacking the dissolved lead, at a position removed from the anode surface, by a precipitating agent liberated from the catholyte and removing said impurities.

21. Apparatus for separating the metals of a matte into a plurality of groups comprising in combination, an electrolytic cell, a scrubbing machine and means for simultaneously removing certain of the plates from said cell and for inserting them into said scrubbing machine and vice versa without disturbing their relative space relationship.

In testimony whereof I have affixed my signature.

ELMER A. SPERRY.